Nov. 3, 1959   P. DAMIRON   2,911,075
BRAKE SHOES
Filed Feb. 2, 1956
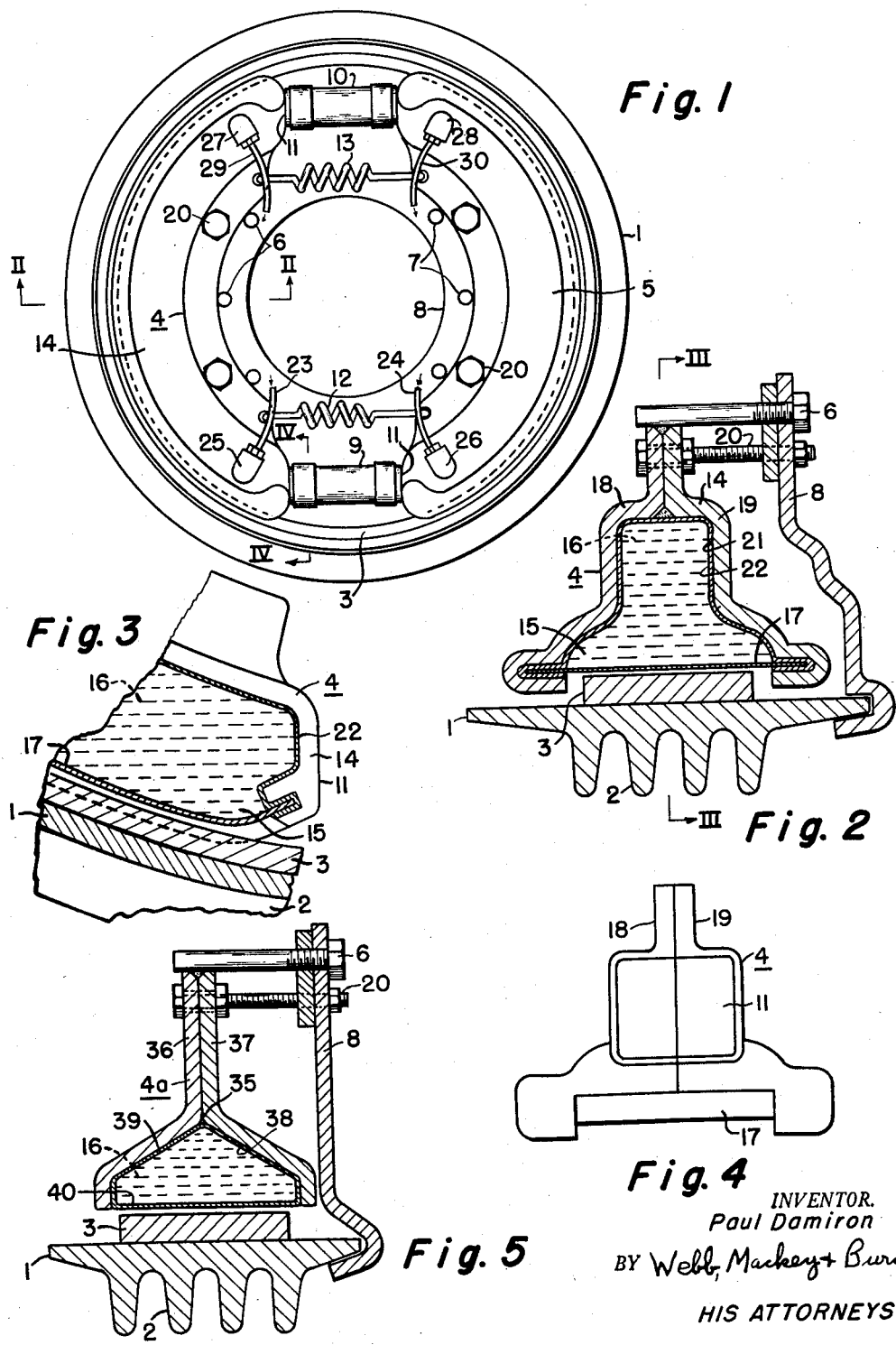
INVENTOR.
Paul Damiron
BY Webb, Mackey + Burden
HIS ATTORNEYS

United States Patent Office 2,911,075
Patented Nov. 3, 1959

2,911,075

BRAKE SHOES

Paul Damiron, Paris, France

Application February 2, 1956, Serial No. 563,146

8 Claims. (Cl. 188—264)

This application is a continuation-in-part of my copending application, Serial No. 490,010, filed February 23, 1955 and now abandoned.

My invention relates generally to brakes, and more particularly, to brake shoes for brakes mounted upon wheeled vehicles such as automobiles, buses and trucks.

Excessive heat generated during the application of vehicle brakes and the inability to quickly and efficiently dissipate this heat are serious problems in the automotive field. In the first place, excessive heat and its accumulation materially reduces the efficiency of brakes. Where hard and/or continuous use of brakes has generated and accumulated a substantial amount of heat, proper braking requires a braking force which is greater than that regularly used and which must be applied for a longer interval than normal. Thus, the generation and accumulation of such heat during brake application lowers the efficiency of the brakes.

In the second place, this excessive heat and its build-up substantially reduces brake life. For example, it changes the texture of brake linings, causes the brake lining to wear more rapidly and produces deformation of the brake shoes.

In the third place, excessive heat and its accumulation has produced brake failures which frequently have caused serious accidents. Such brake failures have occurred generally after hard and/or continuous use of the vehicle brakes.

My invention provides a brake shoe which, even after hard and/or continuous use thereof, quickly and efficiently dissipates heat generated during application of the vehicle brakes. Consequently, my invention prevents a build-up of excessive heat by dissipating the heat rapidly as it develops. To obtain this heat dissipation I use a brake shoe which comprises a brake shoe body having a chamber substantially filled with a fluid. One wall of the chamber is a thin metal strip and forms the friction bearing surface of the brake shoe which engages the brake lining carried by the brake drum. The fluid in the chamber provides a backing for the thin metal strip. Heat generated in braking is transferred quickly through the thin metal strip to the fluid which is circulated within the shoe and externally cooled. Heat generated during braking is thereby quickly dissipated and the braking surfaces remain cool.

In the accompanying drawings I have shown a preferred embodiment of my invention in which:

Figure 1 is a side elevation view of a brake employing a pair of my brake shoes;

Figure 2 is a section view along the line II—II of Figure 1;

Figure 3 is a section view along the line III—III of Figure 2; and

Figure 4 is a section view along the line IV—IV of Figure 1.

Figure 5 is a section view of a modification of my invention taken along a line corresponding to the line II—II of Figure 1.

The drawings show my invention adapted to a well-known type of automobile brake. This brake has a cylindrical drum 1 equipped with cooling fins 2 and adapted to be mounted upon a wheel of an automobile. Affixed to the brake drum 1 is a brake lining 3 which extends completely around the inside of the drum. The brake shown in Figure 1 uses two of my brake shoes 4 and 5 which will be described in detail hereinafter. Bolts 20 affixed to brackets such as bracket 8 support these brake shoes. The bracket 8 is mounted upon an axle housing (not shown) and hence, is stationary.

A pair of hydraulic cylinders 9 and 10 actuated by a conventional hydraulic system (not shown) force the brake shoes 4 and 5 against the brake lining 3 to initiate braking action. These hydraulic cylinders engage the ends of the brake shoes, which ends have a substantially flat face 11 (see Figure 4). At the end of a braking interval, a pair of springs 12 and 13 withdraw the shoes from the brake lining and hold them against stops 6 and 7.

As shown in Figures 1, 2 and 3, my brake shoe 4 comprises a brake shoe body 14 having a chamber 15 filled with a fluid 16. One wall of the chamber is a thin metal strip 17 which is in direct contact with the fluid. This thin metal strip is the friction bearing surface of the brake shoe; i.e., that part of the brake shoe which contacts and is forced against the brake lining when the brake shoes are actuated by the wheel cylinders 9 and 10.

The fluid in the chamber 15 has two important functions. The first is that it provides a backing for the thin metal strip which otherwise would not be rigid enough to effect braking action between the brake shoe and the drum. Upon application of the brakes this fluid backing and the thin metal strip provide a relatively uniform braking force or pressure over most of the brake lining in contact with the shoe since it has flexibility in addition to sufficient rigidity for efficient braking. Increased brake lining life results from this uniform brake force or pressure because there is little uneven lining wear.

The second function is that the fluid which circulates through the chamber 15 rapidly and efficiently dissipates heat generated by the application of the brakes and specifically between the brake lining and the thin metal strip. This heat dissipation occurs at the place of heat generation. Hence, excessive heat and excessive heat build-up does not result because as soon as heat is generated it is carried away.

For the chamber 15 to perform these two functions, it is necessary that the fluid filling the chamber be under pressure, that excessive pressure build-ups be avoided and that the fluid circulate through the chamber. A cooling system and a spring loaded outlet valve control the circulation of fluid through the chamber and control the pressure of the fluid therein. Specifically, the system delivers fluid under pressure to the chamber and the outlet valve prevents escape of the fluid therefrom unless the pressure of the fluid exceeds a predetermined value in which case, the valve opens. The system can deliver fluid at pressures above the predetermined value so that circulation of cooling fluid is assured when desired.

When the brake shoe is forced against the lining on the drum there is a tendency for the thin strip to deflect inwardly relative to the chamber. Since the fluid inside the chamber is maintained under pressure, it not only forms a backing for the thin strip as pointed out above but also holds the strip flat, against the lining to obtain substantially uniform lining wear.

The thin metal strip performs one highly important function. Because it is thin and because it is preferably made from metals having good heat conductivity, the strip quickly conducts heat generated in braking to the fluid. Since the fluid is circulated through the shoe and is externally cooled, the heat generated during braking cannot build up. Thus, the braking surfaces remain substantially cool.

Referring specifically to Figures 2 and 3, the brake shoe body 14 comprises two fabricated metal sections 18 and 19 joined together by welding to form a cavity 21. Stretched across the opening of the cavity is the thin metal strip 17 with its ends firmly gripped by the folded under edges of the sections 18 and 19. The combination of the sections and the thin metal strip form the chamber 15.

To insure that chamber 15 is fluidtight, I use a plastic lining 22 which fits around the inside of the cavity and in around that part of the metal sections which grip the ends of the thin metal strip. This lining assists in obtaining the uniform braking force or pressure referred to above by allowing a slight lateral displacement of the thin metal strip when the strip is forced against the brake lining.

For efficient heat dissipation I have found that a gauge of .04" for the thin metal strip is preferable. However, satisfactory results may be obtained with gauges ranging from .020" or less to .060" or greater.

The thin metal strip of my brake shoe may be made from metals having good heat conductivity. Such metals as copper, nickel, aluminum, Monel metal, steels including stainless steels, are suitable.

Among the fluids which are satisfactory for dissipating the heat generated during braking are water, Freon, glycerins, oils, glycols, hydraulic brake fluids and others.

A conventional cooling system (not shown) having a pump, a fluid reservoir and a heat exchanger circulates the fluid through the chamber whenever the vehicle on which it is mounted is in operation. The pump delivers fluid under pressure to conduits 23 and 24 through which it flows to conventional spring loaded check valves 25 and 26. These valves control the admission of fluid to the brake shoe chambers. I so adjust the valves that the fluid enters the chambers when the pressure in the conduits 23 and 24 exceeds a predetermined value.

To eliminate needles circulation of the fluid through my shoes when the brakes are not in use or have been lightly applied, I employ a conventional thermostat (not shown) to control the pump. This thermostat, which is connected to the fluid within the chamber, starts the pump only when the temperature of the fluid in the chamber exceeds a predetermined value.

To prevent the pressure exerted by the hydraulic cylinders upon my brake shoes from buckling or damaging the thin metal strip or shoe, I maintain the pressure within the chamber above that applied by the cylinders. This pressure within the chamber maintains the thin metal strip sufficiently rigid for brake application even when the cylinders 9 and 10 deliver their maximum pressure to the brake shoes.

Conventional spring loaded check valves 27 and 28, similar to the valves 25 and 26, control the flow of fluid from the chambers to conduits 29 and 30 leading to the fluid reservoir. These spring loaded check valves permit the flow of fluid from the chambers when the pressure therein exceeds a predetermined value. Thus, spring loaded valves 27 and 28 insure that at all times there is fluid in the chamber 15 to both back up the thin metal strip and cool it. Hence, at all times my brake shoes can exert a braking force even when the pump does not operate.

Figure 5 shows a modification of my invention in which the brake shoe 4a comprises a brake shoe body 35 formed from two fabricated metal sections 36 and 37 welded together to form a cavity 38. Fitting inside the cavity and welded to the metal sections 36 and 37 is a container 39 preferably made from metal. The container 39 holds a cooling fluid 16. One wall 40 of this container is thin metal and it is this wall 40 like the thin metal strip 17 which is the friction bearing surface of this brake shoe.

The brake shoe of Figure 5 is mounted on a bracket the same as the brake shoe of Figure 3 and both shoes use the same cooling system which has been described above.

As shown in Figure 5, the fabricated metal sections 36 and 37 do not overlap the thin metal wall 40 of the container 39 as do the fabricated metal sections 18 and 19 overlap the thin metal strip 17 but the ends of the sections 36 and 37 at the opening of the cavity 38 are flush with the metal wall 40. This arrangement of having the ends of the metal sections 36 and 37 at the opening of the cavity 38 flush with the thin metal wall 40 of the container 39 permits this brake shoe to be easily mounted and dismounted by a side slipping on or off operation relative to the bracket 8. In addition, this arrangement provides quick and easy access to the brake lining 3.

The component parts of the brake shoe of Figure 5 are easy to fabricate and the shoe itself easy to assemble, thereby making its manufacture economical. The use of the container 39 for holding the cooling fluid 16 almost eliminates the likelihood of leakage of fluid therefrom, thus making this shoe dependable for long service.

From the foregoing it is clear that my invention has important features. The first is the ability to efficiently and rapidly dissipate heat at its place of generation even after hard and continuous use of brakes. Thus, my invention prevents build-up of excessive heat. This means that brakes equipped with my brake shoes operate more efficiently, have a longer life and avoid failures caused by excessive heat or heat build-up.

The second important feature is the application of substantially uniform brake pressures or forces upon substantially most of the brake lining in contact with my brake shoes. This increases brake lining life since the lining wear is relatively uniform.

While a certain present preferred embodiment of my invention has been shown and described, it will be understood that it may be otherwise embodied within the scope of the appended claims.

I claim:

1. In a brake for wheeled vehicles having a mounting with a brake lining adapted to be engaged by a brake shoe, the combination comprising a brake shoe having a brake shoe body, said body having a chamber filled with a fluid, one wall of said chamber being a thin metal strip, said thin metal strip being the friction bearing surface of said brake shoe, said thin metal strip lacking sufficient rigidity to effect a braking force, said fluid providing a backing for said thin metal strip so that said strip is rendered sufficiently rigid to effect a braking force, means connected to said chamber and adapted to connect the chamber to a source of fluid under pressure for cooling and circulating said fluid through said chamber so that the thin metal strip is cooled during braking, means connected to said chamber for maintaining fluid under pressure in said chamber so that at all times said thin metal strip is sufficiently rigid to effect a braking force, the means connected to said chamber for maintaining fluid under pressure in said chamber controlling the discharge of fluid from said chamber.

2. The combination of claim 1 characterized by means for urging said brake shoe into engagement with the brake lining.

3. The combination of claim 1 characterized by means for controlling the entry of fluid into said chamber.

4. The combination of claim 1 characterized by means for controlling the entry of fluid into said chamber and by means for urging said brake shoe into engagement with the brake lining.

5. In a brake for wheeled vehicles having a mounting with a brake lining adapted to be engaged by a brake shoe, the combination comprising a brake shoe having a brake shoe body with a cavity, a container filled with a fluid fitting into said cavity and being affixed to said brake shoe body, one wall of said container being thin metal, said wall being the friction bearing surface of said brake shoe, said wall lacking sufficient rigidity to effect a braking force, said fluid providing a backing for said thin metal strip so that said strip is rendered sufficiently rigid to effect a braking force, said wall being substantially flush with the ends of the brake shoe body at the opening of said cavity, means connected to said container and adapted to connect the container to a source of fluid under pressure for cooling and circulating said fluid through said container so that the thin metal is cooled during braking, means connected to said container for maintaining fluid under pressure in said container so that at all times said thin metal is sufficiently rigid to effect a braking force, the means connected to said container for maintaining fluid under pressure in said chamber controlling the discharge of fluid from said container.

6. The combination of claim 5 characterized by said brake shoe body being made from two sections joined together to form a cavity.

7. In a brake for wheeled vehicles having a mounting with a brake lining adapted to be engaged by a brake shoe, the combination comprising a brake shoe having a brake shoe body made from two sections joined together to form a cavity, a thin metal strip stretched across the opening of said cavity to form a chamber comprising said sections and said thin metal strip, said chamber being filled with a fluid, the ends of said thin metal strip being gripped by the ends of said sections which fold under the ends of the strip, said thin metal strip being the friction bearing surface of said brake shoe, said thin metal strip lacking sufficient rigidity to effect a braking force, said fluid providing a backing for said thin metal strip so that said metal strip is rendered sufficiently rigid to effect a braking force, means connected to said chamber and adapted to connect the chamber to a source of fluid under pressure for cooling and circulating said fluid through said chamber so that the thin metal strip is cooled during braking, means connected to said chamber for maintaining fluid under pressure in said chamber so that at all times said thin metal strip is sufficiently rigid to effect a braking force, the means connected to said chamber for maintaining fluid under pressure in said chamber controlling the discharge of fluid from said chamber.

8. The combination of claim 1 characterized by said thin metal strip being about .020" to about .060" in thickness.

References Cited in the file of this patent

UNITED STATES PATENTS

| | | |
|---|---|---|
| 464,949 | Alden | Dec. 15, 1891 |
| 1,026,274 | McGiffert | May 14, 1912 |
| 1,131,810 | Zoller et al. | Mar. 16, 1915 |
| 1,952,967 | Boughton | Mar. 27, 1934 |
| 2,051,286 | Boykin | Aug. 18, 1936 |
| 2,152,489 | Lamb | Mar. 28, 1939 |
| 2,226,457 | Whittingham | Dec. 24, 1940 |
| 2,821,272 | Sanford et al. | Jan. 28, 1958 |
| 2,821,273 | Sanford et al. | Jan. 28, 1958 |

FOREIGN PATENTS

| | | |
|---|---|---|
| 670,452 | Germany | Dec. 22, 1938 |
| 896,915 | Germany | Nov. 16, 1953 |

UNITED STATES PATENT OFFICE
CERTIFICATE OF CORRECTION

Patent No. 2,911,075 November 3, 1959

Paul Damiron

It is hereby certified that error appears in the printed specification of the above numbered patent requiring correction and that the said Letters Patent should read as corrected below.

Column 3, line 41, for "needles" read -- needless --.

Signed and sealed this 3rd day of May 1960.

(SEAL)
Attest:

KARL H. AXLINE
Attesting Officer

ROBERT C. WATSON
Commissioner of Patents

UNITED STATES PATENT OFFICE

CERTIFICATE OF CORRECTION

Patent No. 2,911,075            November 3, 1959

Paul Damiron

It is hereby certified that error appears in the printed specification of the above numbered patent requiring correction and that the said Letters Patent should read as corrected below.

Column 5, line 15, for "chamber" read -- container --.

Signed and sealed this 11th day of October 1960.

(SEAL)
Attest:

KARL H. AXLINE
Attesting Officer

ROBERT C. WATSON
Commissioner of Patents